United States Patent Office 3,339,326
Patented Sept. 5, 1967

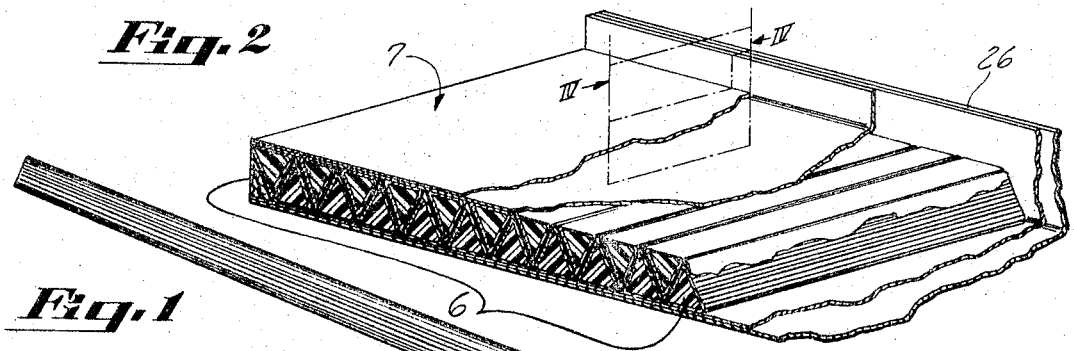
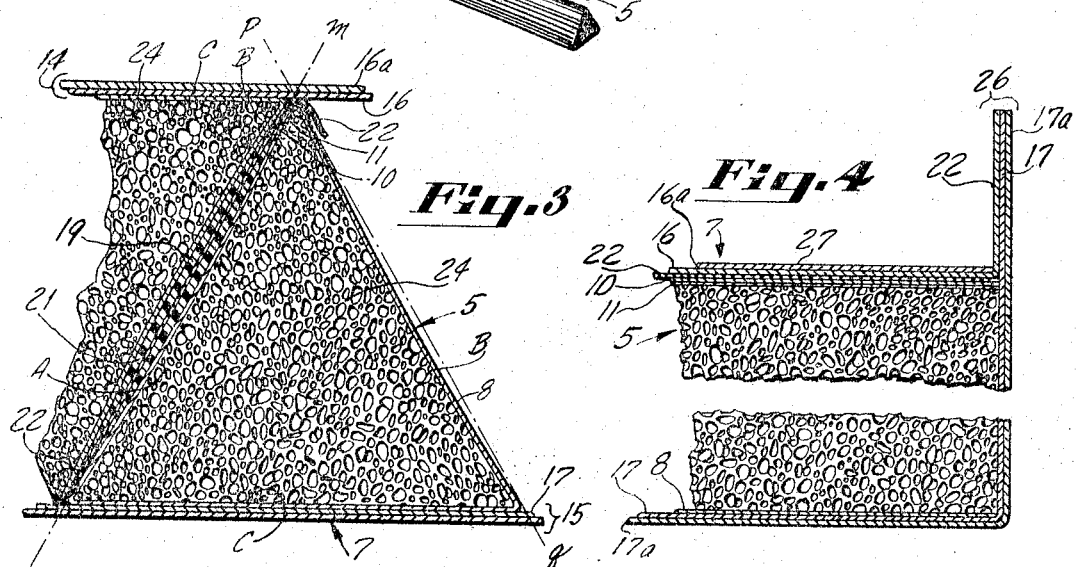

3,339,326
PANEL WITH TRIANGULAR CROSS-SECTION
FOAM CORE ELEMENTS
Henry H. Derr, Roxboro, and Bernard G. Gentry, Timberlake, N.C., assignors, by mesne assignments, to Midland-Ross Corporation, Cleveland, Ohio, a corporation of Ohio
Filed July 6, 1964, Ser. No. 380,481
5 Claims. (Cl. 52—309)

This invention relates to a panel suitable for plate or beam loading, such as that occurring to the floor of a cargo container or other support wherein the member on which the load rests has no undersupport other than media connecting with its periphery.

There is a need for lightweight panel-shaped structures as floors, or for supporting floors and the like, which may be integralized with the side walls of cargo containers, aircraft fuselages, lading-receiving compartments of ships, etc., without the need for underframes such as customarily used for railway car or highway trailer bodies. In the uses contemplated, especially in aircraft and cargo container construction, the economic advantages of reducing the tare weight of the carrier without sacrificing required load-carrying capacities are, conservatively speaking, very substantial during the full service life of such structures.

The principal object of this invention is to provide a panel or slab-shaped unit adapted for plate or beam-loading characterized by high load capacity to weight ratio.

A further object essential to the invention is the provision of an element of which various numbers thereof may be used to provide the panel of the foregoing object in different sizes with the length of the panel varying in accordance with the number of elements.

Still another object is to provide a load-supporting panel adapted for beam or plate loading which is generally unaffected by weather or atmospheric condition throughout an indefinite service-life.

It is also an object to provide a load-supporting unit in accordance with the foregoing objects of low cost commercially available materials.

The invention which achieves these objects resides, in brief, in a panel having its surface predominantly in two oppositely facing spaced surfaces and comprising a plurality of elongate three-sided elements of triangular cross-section disposed between the oppositely-facing surfaces.

In a preferred embodiment of the invention, the elements have thin walls of substantially inelastic material, and the elements and the oppositely facing walls of the panel are all bonded together by one or more adhesive media. In order to achieve maximum strength, the triangular elements comprise thin walls of substantially non-elastic high strength material enclosing a region filled with a low-density rigid material, such as a cured plastic foam.

In the drawings with respect to which the invention is described:

FIG. 1 is a perspective view of a beam element of triangular cross-section used in load-supporting panels such as that shown in FIG. 2.

FIG. 2 is a fragmentary perspective view with parts in section illustrating a panel comprising triangular elements in accordance with this invention.

FIG. 3 is an enlarged fragmentary elevation in cross-section of the panel of FIG. 2 taken from the cross-sectional face exposed in the foreground of FIG. 1.

FIG. 4 is a fragmentary vertically shortened elevation in cross-section taken along line IV—IV of FIG. 1 lengthwise of the triangular elements.

FIG. 5 is a horizontally shortened cross-sectional elevation of the panel of FIG. 1 attached to the front and rear container end frames.

FIG. 5a is a fragmentary schematic exploded view of components of the panel of FIGS. 1 to 5.

FIG. 6 is a transverse cross-section of a modified triangular element for use in panels, such as those shown in FIGS. 1 and 5.

FIG. 1 illustrates in perspective an elongate element 5 of which its triangular cross-section is apparent more clearly by the enlarged view in FIG. 3. This latter figure is also an enlargement of that which is seen in FIG. 2 when looking directly into a cross-sectional face 6 of panel 7 comprising a plurality of the elements 5. From FIG. 3 it is obvious that each element 5 has a thin outer skin or wall 8. While the invention is not limited to forming the wall 8 in a particular way, the wall 8 may be conveniently shaped from an elongate sheet or ribbon of a substantially non-elastic material such as sheet steel, aluminum, or plastic material for shaping the sheet into three sides, as shown. Two sides include the edges of the sheet turned in appropriate dihedral angles to provide overlapping portions 10 and 11 which form the joint at the dihedral angle between sides A and B in the completed periphery of the element. The overlapping portions are bonded by an adhesive, such as an epoxy composition.

As shown, sides A and B of the wall 8 are those which will be normally adjacent to sides A and B of other elements included therewith in a structure such as the panel 7. Side C, on the other hand, is disposed in parallel juxtaposed relation with outer surface members arranged in spaced co-extending planes and constituting the spaced, usually parallel walls 14 and 15 forming predominantly the outer surface of the panel. Sides C of the elements are shown as flat and are normally bonded to an adjacent sheet member 16 or 17 of the walls 14 and 15, respectively, by a suitable adhesive. When the wall 8 and the sheet members are of metal, epoxy compositions well known in the art as metal bonding agents are recommended. This recommendation does not exclude other good metal-to-metal adhesives, such as methyl cyano-acrylate, polyurethanes, condensed ketons, unsaturated polyesters, resorcinol-furfural resin, and resins which are phenolic combinations with epoxy, polyamide, or vinyl, acetal compounds.

Comparison of side walls A and B with straight dot-dash lines $m$, $n$, and $p$, $q$, respectively, indicate that the side wall sections A and B are concave along their exterior surfaces. Such concavity is intended to stiffen the element 5 against beam-loading in a direction at right angles with the general plane of the respective side wall portion, as represented by one of the straight dot-dash lines.

As a further advantage, an elliptical cavity 19 is formed between side walls A and B of adjacent elements 5 which is useful when filled with resin 21 shown and a series of reinforcing sheets 22 of fibrous material such as glass fabric. As FIG. 5a illustrates, the sheets 22 extend in serial zigzag fashion from one end of the panel to the other between the A and B sides of adjacent elements 5. For purposes of illustration, the cavity 19 is shown in exaggerated thickness.

While a single large sheet could, with a somewhat higher degree of care of measurement and positioning, be used in place of the small-width sheets 22, the latter are preferred at the present state of manufacturing development. Hence, sheet 22, as shown, is of sufficient width to cover the sides A and B of each element 5 placed on the lower wall sheet 17. With sheets 22 approximately positioned, the upper tier of elements 5, as shown in FIG. 5a, are placed in the valleys formed by the lower tier of elements. As assembling of the panel 7 is accomplished manually to a substantial extent, the use of a plurality of sheets 22 facilitates progressive contemporaneous placement of elements, sheets, adhesives, etc. One mode of providing the resinous material is to heavily impregnate and coat each sheet 22 with uncured viscous adhesive resin. In sufficient application, this provides the resinous body indicated by numeral 21 and completely fills the cavity 19. It is intended that the adhesive chosen be one having good adhesion for metal, examples of which have been named above, so that the body of fabric and resin contained within the cavity 21 will unite adjacent sides of adjacent elements 5 together to form a high-strength beam comprising the two adjacent sides of adjacent elements, and the resin fabric body included therebetween, which is resistant to all types of loading.

This is an important feature of the invention since a great deal of the strength of the panel as a whole is contributed by these composite beams extending in trusslike fashion between the two principal outer walls of the panel.

The entire wall 8 of each element 5 encloses the interior region of the element which, as shown, is preferably completely filled with a rigid foam plastic 24. The plastic foam has the function of stiffening the sides of the element during adhesive curing periods and adding to the loading capacity of the panel as a whole. Furthermore, the foam 24 prevents access of air, moisture, or other materials which might permit corrosion, the growth of fungi, and bacterial activity to contribute to deterioration of the panel. For this reason, closed cell foams are preferred.

Among rigid foam plastics available for filling the interior of the elements 5 are commercially prepared foamable compositions of urethanes, polyvinyls, and polystyrene. Foaming the interiors of the elements 5 will ordinarily be accomplished by commercially available compositions introduced into the walls 8 of the elements and foamed in situ. Foaming of the plastic may be done at an intermediate stage of the panel construction wherein one or both ends of the elements are exposed and are accessible for introduction of the foamable composition. It may be preferable, however, to fill the interiors of the elements 5 before they enter the panel assembly procedure.

FIG. 4 is a sectional view taken longitudinally of the elements 5 to illustrate the manner in which the various sheet members of the walls 14 and 15 enter into the construction of the panel 7 along lateral extremities thereof which normally join with the side walls of, e.g., a cargo container. The panel has vertical flanges along its sides, typified by flange 26 of FIGS. 1 and 4, which extend upwardly relative to the upper surface 27 of the panel. FIG. 4 shows the flange 26 to be formed of both sheet members 17 and 17a of the bottom wall 15 and one sheet member 22 of the top wall. The sheet members 17 and 17a of the bottom wall also extend upwardly before becoming a part of the flange to enclose the ends of the elements 5. The portions of the member comprising flange 26 are bonded together by a suitable adhesive.

The panel 7 is shown in FIG. 5 attached to frames 31 and 32, such as might be used in the closed-end and door end of a cargo container. As shown, the ends of the panel 7 fit within channel-like sill portions 33 and 34 of the frames 31 and 32, respectively. At each end of the panel, the outer walls or envelope thereof comprising, for example, sheet steel material, enclose solid pieces 36 and 37 which fill out the rectangular cross-section of a series of the triangular elements 5 in order that the outside contour of the panel may be square cornered and more adapted to fit conventional frame construction. As shown, the pieces 36 and 37 comprise wood. A plurality of pieces 36 are provided in the end of the panel fitting into the door frame 31 in order to provide greater resistance to concentrated loading such as occurs when a fork-lift truck enters the container from a platform adjacent thereto having a different elevation. Wooden members inside the panels adjacent the ends, particularly the door frame end, are useful for attaching fixtures, since screws may be anchored therein more readily than within the elements 5.

The panel itself is assembled generally as shown in FIGS. 1 and 5 with the adhesive materials incorporated therein in an uncured state. In order to achieve most effective integration of all components by bonding, subjecting of the entire panel to pressure and heat is desirable. Hence, heatable male and female molds provide a mold cavity complementary to the finished panel contour shape and compactness of the components into tight condition during curing of the adhesive materials carried in the panel.

FIG. 6 is a cross-section of an element 40 useful in the same manner as the element 5, comprising a foamed plastic preform 41 wrapped to form an outer wall 42 consisting of a fibrous material impregnated with a resinous composition. Various types of fibrous materials are suitable for the purpose of wrapping the preform but fibers of glass are a preferred material. The wrapping material may take the form of square woven fabric wrapped in one piece about the preform 41, or fabric of which the strands extend predominantly in one direction longitudinally of the preform 41 or yarn, roving, or other strands wrapped spirally about the preform and, in any case, impregnated with a resinous material having good adhesion with the preform. The latter is a rigid foam material consisting of e.g., one of the foamable materials mentioned above. The impregnating material for the fibrous wrapping is a resin common to the reinforced plastic art, such as one of the polyesters, polyurethane, or melamine resins, phenolic and modified-phenolic resins, and polyamides. For this purpose, the polyesters common to laminating art are economical and suitable.

The terms and expressions which have been employed are used as terms of description and not of limitations, and there is no intention of excluding such equivalents of the invention described or of the portions thereof as fall within the scope of the claims.

What is claimed is:
1. A panel adapted for plate or beam loading comprising:
a plurality of substantially rigid elements of triangular cross-section disposed in side-by-side relationship between two spaced co-extending planes with one side of each element in one of said planes, each of its other two sides being outwardly concave and, when adjacent to another one of said elements, one of said other sides of one element being in juxtaposed relation with one of said other sides of the adjacent element forming an elliptical cavity, said sides of each element are constituted of a single piece of substantially non-elastic sheet material enclosing a region and each element is filled with a non-elastic plastic foam;
substantially non-elastic sheet material disposed generally within said planes in juxtaposition with said sides of said elements; and
adhesive means joining the latter of said sheet material to said sides in juxtaposition therewith, and joining said concave element sides which are in juxtaposition.
2. The panel of claim 1 wherein:
said adhesive means comprises a layer of fibrous material and an adhesive composition filling and impregnating said material, said composition joining said layer wth each pair of juxtaposed sides of the elements, said layer approximately filling the spaces formed between juxtaposed concave sides.
3. The panel of claim 2 wherein:
said fibrous material is in sheet form and disposed in zigzag pattern serially between said juxtaposed sides of the elements.
4. The panel of claim 2 wherein:
said fibrous material of the layer is a fabric of glass filaments;
said non-elastic sheet material comprises metallic sheet members.

5. The panel of claim 4 comprising:
wooden end pieces juxtaposed and coextensive with the first and last element of said plurality shaped to provide an end surface of the panel of a desired contour;
a sheet metal envelope, including said metallic sheet members tightly enclosing said plurality of elements including said wooden end pieces; and
adhesive means joining the elements, the end pieces, and interior surfaces of the envelope in opposed relation with the end pieces and the elements, thereby structurally integrating the panel.

References Cited

UNITED STATES PATENTS

| | | | |
|---|---|---|---|
| 1,842,736 | 1/1932 | Stout | 244—123 |
| 2,173,808 | 9/1939 | Kellogg | 52—615 |
| 2,482,798 | 9/1949 | Rheinfrank et al. | 244—123 |
| 2,835,623 | 5/1958 | Vincent et al. | 52—309 X |

FOREIGN PATENTS

| | | |
|---|---|---|
| 577,790 | 5/1946 | Great Britain. |

JOHN E. MURTAGH, *Primary Examiner.*

RICHARD W. COOKE, JR., *Examiner.*